Figure 1:
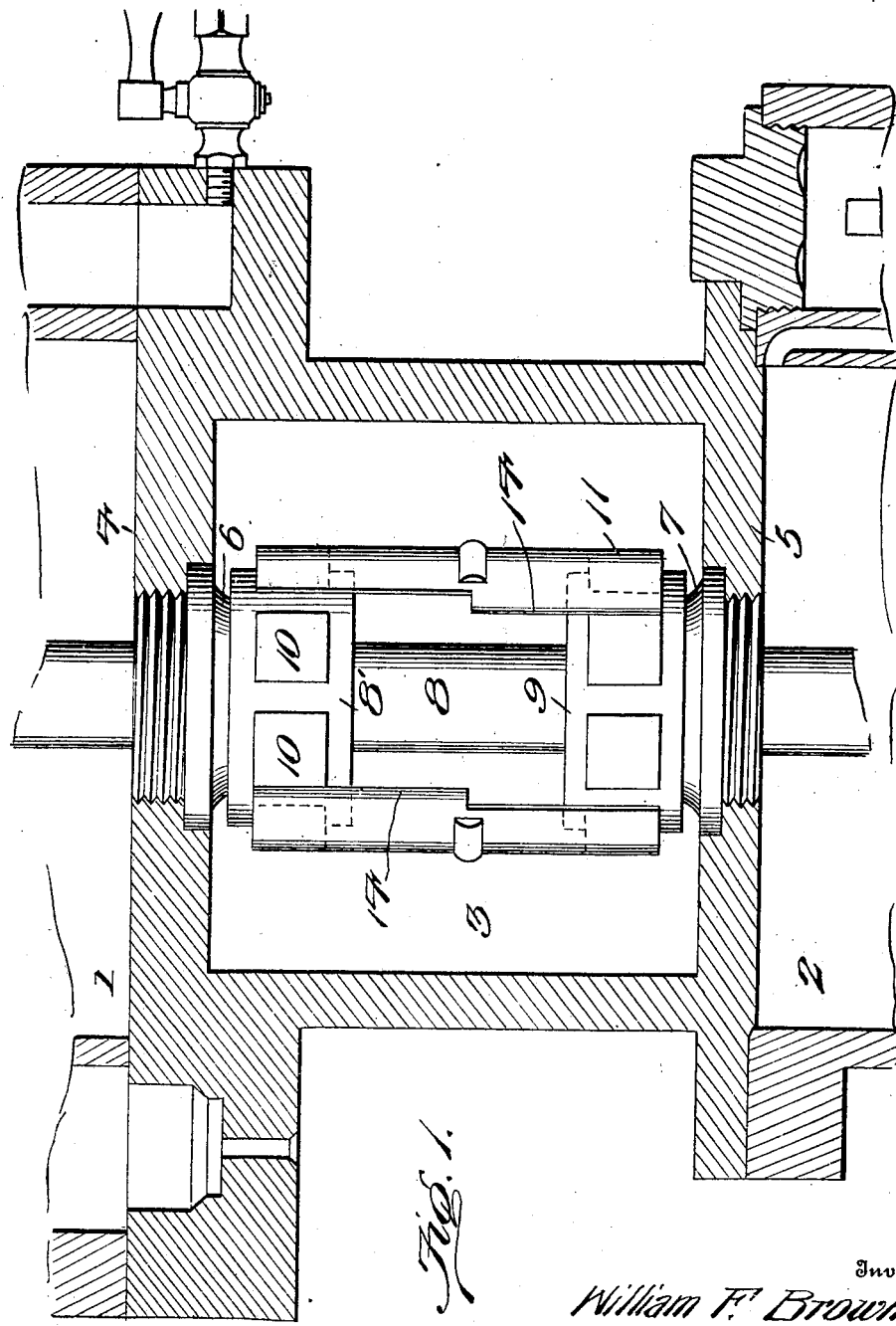

No. 882,369. PATENTED MAR. 17, 1908.
W. F. BROWN.
NUT LOCK.
APPLICATION FILED APR. 24, 1907.

2 SHEETS—SHEET 1.

Witnesses

Inventor
William F. Brown,

By Victor J. Evans
Attorney

No. 882,369. PATENTED MAR. 17, 1908.
W. F. BROWN.
NUT LOCK.
APPLICATION FILED APR. 24, 1907.
2 SHEETS—SHEET 2.
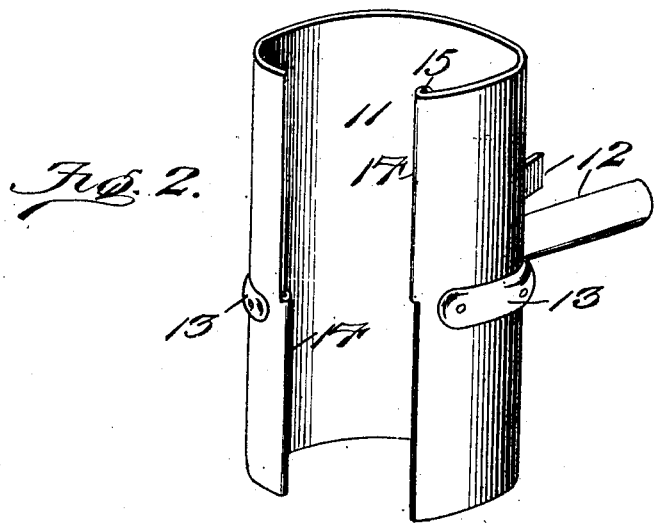
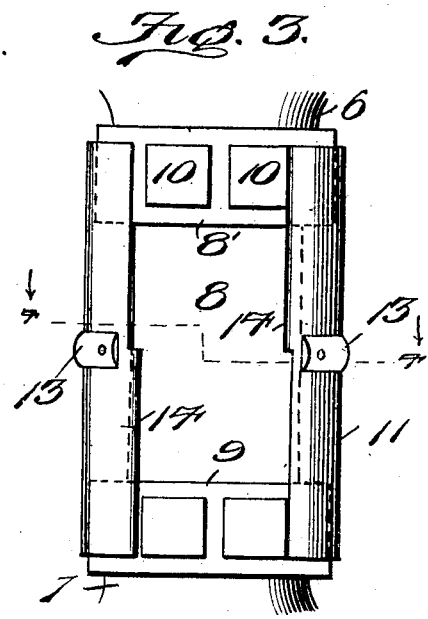
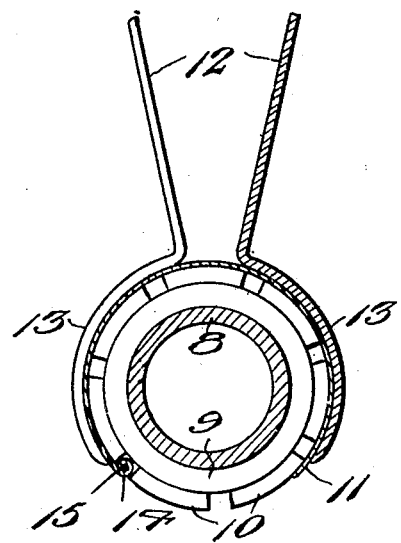
Inventor
William F. Brown,
Witnesses
By Victor J. Evans
Attorney

UNITED STATES PATENT OFFICE.

WILLIAM F. BROWN, OF BALTIMORE, MARYLAND.

NUT-LOCK.

No. 882,369.     Specification of Letters Patent.     Patented March 17, 1908.

Application filed April 24, 1907. Serial No. 370,095.

*To all whom it may concern:*

Be it known that I, WILLIAM F. BROWN, a citizen of the United States of America, residing at Baltimore city, and State of Maryland, have invented new and useful Improvements in Nut-Locks, of which the following is a specification.

This invention relates to improvements in nut locks, comprehending particularly a device of this kind designed for use in connection with the air pumps of locomotives for holding the gland nuts between the steam and air cylinders of such pumps from movement and preventing the same from loosening under the action of the piston rod and motion of the running engine.

The prime object of the invention is to provide a device of this character which is designed to fit within the stuffing chamber between the cylinders and to engage and lock both gland nuts therein against retrograde rotation, thereby maintaining the nuts in a predetermined position of adjustment, and preventing any possibility of tightening or loosening of the packing and the consequent deleterious action on the pump mechanism, the device being so constructed as to permit of its ready and convenient application and removal.

In the accompanying drawing illustrating the invention,—Figure 1 is a vertical cross section through the stuffing chamber between the steam and air cylinders of the pump, showing the application of the invention for locking the gland nuts against movement. Fig. 2 is a perspective view of the nut lock detached. Fig. 3 is a front elevation, showing the locking device in engagement with the gland nuts. Fig. 4 is a transverse section on line 4—4 of Fig. 3.

Referring to the drawing, the numerals 1 and 2 respectively designate the steam and air cylinders of a pump of the character described, and 3 the stuffing chamber arranged between the same, the said chamber being separated from the respective cylinders by the partition walls 4 and 5 which are provided with threaded openings in which are screwed the stuffing boxes 6 and 7 through which reciprocates the piston rod 8, the said boxes being provided, respectively, with the gland nuts 8' and 9 adjustable to regulate the pressure of the packing therein on the piston rod. Each nut is provided, as usual, with an annular series of spaced lugs 10 adapted to be engaged by the jaws of a spanner wrench, by which the nuts may be conveniently tightened or loosened as occasion may require.

Owing to the action of the piston rod 8, which often in the operation of the pump reciprocates at high speed, and to the vibration and strain upon the parts in the running of the engine, the nuts 8' and 9 are liable to loosen and allow expansion and loosening of the packing, thus causing leakage of steam and air, and reducing to a material extent the efficiency of the pump. In order to overcome this difficulty it has been customary to screw the nuts very tight, it being necessary in many cases to tighten them up to such an extent as to cause the packing to bear with objectionable pressure on the piston rod, resulting in the rapid wear and deterioration of the packing and the heating of the parts of the pump from friction to such a high degree as to cause serious damage to the pump. My invention is designed to overcome this objection and to provide a device by which the nuts may be firmly held against movement in proper position to hold the packing with the proper degree of pressure at all times against the piston, and which will at the same time enable the nuts to be readily adjusted whenever occasion may require. The device comprises a split or nearly cylindrical sheet metal band or body 11, constructed of spring steel or other spring metal and of sufficient length and diameter to extend between and partially encircle the nuts 8' and 9. Divergently arranged handles 12 are disposed at the rear of the body and are provided with segmental portions 13 riveted or otherwise suitably secured to the sides of the body, so that upon compression or inward movement of the handles the body may be expanded for application to and removal from the nuts, the contractile energy of the body serving to cause it to return to normal position or to contract when the handles are released, thus adapting it to firmly and securely grip the nuts.

In order to secure an effective engagement between the locking device and nuts the free edges of the body are provided with projecting locking portions 14 arranged above and below the transverse center line thereof to respectively engage the slots or spaces between the lugs 10 of the two nuts 8' and 9, said locking portions preferably being formed by inturning the edges of the metal to form a bead inclosing a stiffening strand or wire 15. Inasmuch as the nuts 8' and 9 are reversely threaded upon their respective boxes, it will accordingly be understood that the spring nut locking cylinder in connecting them causes the nuts to mutually exert resistance of one to the retrograde rotation of the other, so that both nuts will be held securely in the positions to which they have been adjusted. As is well known, the chamber 3 is provided with a side opening, not shown, through which access to the gland nuts is permitted. The nut lock may be inserted and removed through this opening and conveniently applied and released by expansion and contraction through the medium of the handles 12. The device may be made of such length as to rest upon the bottom partition wall 5 to prevent any possibility of its downward movement under vibration, but, owing to the security of its gripping engagement, this is not absolutely necessary.

By the use of a nut lock of this character the gland nuts will be positively locked against movement, so that after their adjustment to hold the packing in proper position and the application of the locking device thereto no further attention is required, except a casual inspection from time to time to determine whether or not the nuts require adjustment to compensate for wear. As a consequence the packing will bear with such a nicety of pressure on the piston rod 8 as to prevent any undue amount of friction and injury to the pump will thereby be prevented. Owing to the tendency of the nuts to loosen, it has been the practice to employ high grade and expensive packing in order to prevent as far as possible leakage and undesirable friction from the ensuing variableness of pressure of the packing on the piston rod. As a uniformity of pressure is preserved by the retention of the nuts in adjusted position by my improved lock, cheaper grades of packing may be employed without loss of efficiency. The device may be inexpensively manufactured and, as no wear or strain falls thereon, will last for an indefinite period.

The device is not confined in use to locking the gland nuts of a pump of the character described, but may be employed for locking similarly situated nuts of other pumps, machine elements and the like.

Having thus described the invention, what is claimed as new, is:—

1. The combination with a pair of spaced reversely threaded nuts, of a lock therefor comprising a longitudinally split spring band of a length and diameter to extend between and partially encompass said nuts, said band being provided with means to interlock peripherally with the nuts, and handles applied to the band whereby it may be expanded and sprung out of engagement with the nuts.

2. A nut lock comprising a spring metal band having inturned engaging members at its free edges to interlock with notches in a pair of spaced nuts, and divergent handles applied to the rear of the band whereby it may be expanded.

3. A nut lock comprising a nearly circular band of spring sheet metal, having portions of its free edges bent to provide locking members respectively arranged above and below its transverse center, and handles connected with the band and extending outwardly in divergent relation.

4. The combination with a pair of spaced reversely threaded nuts, each having a series of peripheral locking notches, of a lock therefor comprising a longitudinally split spring band of a length and diameter to extend between and partially encompass said nuts, said band being provided at its free edges with inturned locking portions to engage the notches in the nuts, and handles projecting from the rear of the band whereby it may be expanded and sprung out of engagement with the nuts.

5. A nut lock comprising a nearly circular band of spring sheet metal having locking portions at its free edges and handles connected with the band and extending outwardly in divergent relation from the back thereof.

In testimony whereof, I affix my signature in presence of two witnesses.

WILLIAM F. BROWN.

Witnesses:
   WILLIAM S. PEARCE,
   WILLIAM S. MACKLEY.